(12) United States Patent
Popescu et al.

(10) Patent No.: US 7,350,026 B2
(45) Date of Patent: Mar. 25, 2008

(54) MEMORY BASED CROSS COMPARE FOR CROSS CHECKED SYSTEMS

(75) Inventors: Mario Popescu, Woodbridge (CA); Stephen Barr, Mississauga (CA); Alexander Trica, Toronto (CA)

(73) Assignee: Thales, Neuilly sur Seine (FR)

( * ) Notice: Subject to any disclaimer, the term of this patent is extended or adjusted under 35 U.S.C. 154(b) by 207 days.

(21) Appl. No.: 11/002,237

(22) Filed: Dec. 3, 2004

(65) Prior Publication Data

US 2006/0123202 A1      Jun. 8, 2006

(51) Int. Cl.
*G06F 12/00* (2006.01)
*G06F 13/00* (2006.01)
*G06F 13/28* (2006.01)
*G06F 11/00* (2006.01)

(52) U.S. Cl. ............... 711/119; 711/149; 711/153; 711/162; 711/173; 714/6; 714/11; 714/12

(58) Field of Classification Search .......... 714/820, 714/819; 711/149
See application file for complete search history.

(56) References Cited

U.S. PATENT DOCUMENTS

| | | | | |
|---|---|---|---|---|
| 5,295,258 A * | 3/1994 | Jewett et al. | ............... | 714/12 |
| 5,479,573 A * | 12/1995 | Keeler et al. | ............... | 706/21 |
| 5,559,450 A | 9/1996 | Ngai et al. | | |
| 5,715,197 A | 2/1998 | Nance et al. | | |
| 5,867,692 A * | 2/1999 | Bhandari et al. | ............ | 713/400 |
| 5,909,541 A * | 6/1999 | Sampson et al. | ............... | 714/6 |
| 5,970,240 A | 10/1999 | Chen et al. | | |
| 5,978,889 A | 11/1999 | Zigras | | |
| 6,052,619 A * | 4/2000 | John | ............... | 600/544 |
| 6,073,251 A * | 6/2000 | Jewett et al. | ............... | 714/7 |
| 6,181,163 B1 | 1/2001 | Agrawal et al. | | |
| 6,182,196 B1 | 1/2001 | DeRoo | | |
| 6,373,779 B1 | 4/2002 | Pang et al. | | |
| 6,434,642 B1 | 8/2002 | Camilleri et al. | | |
| 6,516,390 B1 * | 2/2003 | Chilton et al. | ............ | 711/138 |
| 2002/0008540 A1 | 1/2002 | Britton et al. | | |
| 2002/0010902 A1 | 1/2002 | Chen et al. | | |

(Continued)

OTHER PUBLICATIONS

Fault-tolerant platforms for automotive safety-critical applications pp. 170-177 Year of Publication: 2003 ISBN:1-58113-676-5.*

(Continued)

*Primary Examiner*—Sanjiv Shah
*Assistant Examiner*—Marwan Ayash
(74) *Attorney, Agent, or Firm*—Sughrue Mion, PLLC

(57) ABSTRACT

A cross compare solution running in a multiprocessor configuration, using a multi-port RAM with built-in logic. This provides for a fast and simple data cross compare medium. The multi-port RAM unit can be plugged into the motherboard of the main processor unit, requiring no external hardware or wiring. A method and a system for cross compare has a first layer of buffers with a first storage area for storing information from the first processor and a second storage area for storing information from the second processor, and a second layer of buffers with a third and fourth storage areas, where each storage area stores information from the first and second storage areas. The first, second, third, and fourth storage areas have one or more buffers allocated only for its respective storage area.

34 Claims, 3 Drawing Sheets

U.S. PATENT DOCUMENTS

2002/0046365 A1* 4/2002 Avizienis .................... 714/43
2002/0057104 A1   5/2002 New et al.
2002/0064172 A1* 5/2002 Siu et al. ................... 370/429
2003/0126404 A1   7/2003 Anjo et al.
2003/0208704 A1* 11/2003 Bartels et al. ............... 714/11

OTHER PUBLICATIONS

Architecture and implementation for a high reliability long-term-mission space computer Publication Date: Oct. 5-8, 1992 On pp. 446-456 ISBN: 0-7803-0820-4.*

* cited by examiner

MEMORY BASED CROSS COMPARE FOR CROSS CHECKED SYSTEMS

BACKGROUND OF THE INVENTION

1. Field of the Invention

Cross Compare for Systems running in a Multi Processor configuration, such as dual, 2-out-of-2, and triplicated, 2-out-of-3 configurations or some other multi-processor configuration.

2. Description of the Related Art

As CPU clock speeds have increased, and multi-processor architectures have become more common, processing performance capabilities have exceeded those of traditional RAM. One solution to this problem has been the adoption of multi-port RAM.

Multi-port RAM comes in many configurations, providing access to a shared memory space via plural input and output ports. Increasingly common is the ability to write plural data to the device simultaneously via separate ports. When data is written simultaneously to the same location from two-or-more ports, the integrity of the data is not guaranteed. The addressed memory location might contain new data, old data, or some transitional value. To mitigate this problem, additional logic is required to implement arbitration. Arbitration is coordinating by the processors access to memory locations.

Some digital computing system applications, for example, vital and mission critical systems require a high degree of safety. For example, for safe operation, an aircraft flight control computer depends upon continuous error-free computing operation for the entire period of flight. It should be recognized that error-free operation requires the elimination of, or containment of faults within the digital computing system. In addition to ever-increasing demands of reliability, a fast computing system with increased throughput is necessary for flight control and other vital systems.

To provide data integrity, more than one processor determines whether discrepancy exists in the information being simultaneously transferred over a bus. This comparison of data for highly accurate results is often referred to as "cross compare". For example, by cross comparing computational results produced by different processors, high integrity of data is provided.

Current cross compare systems running in a multiprocessor configuration are slow, software intensive or complicated to setup. There are several solutions currently available. One solution used for dual systems requires either a parallel or serial port connection. Both parallel port and serial port solutions support only a limited amount of data that can be transferred at one time. The serial port based solution is slow and software intensive. The parallel port solution becomes slow whenever large amounts of data need to be cross compared.

Another solution is for triplicated systems using either a complicated hardware setup or a high speed serial connection which is software intensive and uses external wiring. When implemented using external, rack-based hardware, setup was complicated and hardware intensive. When implemented with high-speed serial communication (Ethernet), the arrangement was software intensive and speed limited by the external wiring.

As an example of a related art system, U.S. Pat. No. 6,182,196 discloses a method and apparatus for arbitrating access requests to a memory. The memory comprises a cross check module (502) comparing the client operation requests. When the cross check module (502) determines that the requests are contemporaneously attempting to access an identical memory block of memory, the cross check (502) arbitrates between the client operation requests. The arbitration is based on an arbitration rule and produces a first memory access request and a second memory access request.

As a further example of a prior system, U.S. Patent Application Publication 2002/0010902 discloses field programmable gate arrays (FPGAs) comprising embedded block RAM (EBR). In an embodiment, the EBR are multiport RAM blocks embedded in a FPGA core. The EBR is used to increase the amount of memory and to complement distributed Programmable Function Unit memory. Arbitration is provided between write ports, and an arbitration unit receives memory request signals and selects a winner from among the requests.

SUMMARY OF THE INVENTION

Illustrative, non-limiting formulations of the present invention may overcome the above disadvantages and other disadvantages not described above. The present invention is not necessarily required to overcome any of the disadvantages described above, and the illustrative, non-limiting formulations of the present invention may not overcome any of the problems described above. The appended claims should be consulted to ascertain the true scope of the invention.

The exemplary formulation of the present invention is a cross compare solution running in a multiprocessor configuration. It is an aspect of the present invention to provide a fast and simple data cross compare medium using a multiport RAM with a built-in logic. The multi-port RAM can be plugged into the backplane of the multiprocessor unit connecting to any standard or even non-standard bus. Therefore no external hardware or wiring is required.

The cross compare system, according to an exemplary, non-limiting formulation of the present invention, employs a method of buffering data, operating at a fast speed limited only by memory access time. The exemplary system is simple to implement and requires no communication protocol.

In an exemplary, non-limiting formulation, the system fits on a single board and requires no external wires. The concept is not tied to any specific hardware, and it is valid in terms of architecture and hardware implementation for any cross-compare data size and any communication speed required. Therefore, if the size and/or speed requirements change, the exemplary system is easily upgradeable by replacing the unit.

The memory-based cross compare solution according to the exemplary, non-limiting formulation of the present invention is based on a Multi Port RAM with its required logic, implemented using a Field Programmable Gate Array (FPGA) or Application-Specific Integrated Circuit (ASIC).

The Multi Port RAM in accordance with the exemplary, non-limiting formulation of the present invention offers controlled write and read access for each System Processor Unit, providing a fast and simple Data Cross Compare medium. Full separation is provided between all the System Processor Units. Since no simultaneous access to any memory location is possible, arbitration is not necessary. The exemplary system is ideally suited for, among other things, cross-checked computer-based safety, mission critical or high availability systems.

According to an illustrative, non-limiting formulation of the present invention, a Cross Compare system for a multiprocessor computer having at least a first and a second processor is provided. The system includes a first layer of buffers comprising a first storage area for storing information from the first processor and a second storage area for storing information from the second processor. A second layer of buffers is also provided. The second layer of buffers comprise a third storage area for storing the information from the first storage area and the information from the second storage area, and a fourth storage area for storing the information from the first storage area and the information from the second storage area. The information from the first storage area and the second storage area is automatically transferred to the third storage area and the fourth storage area. The first, second, third, and fourth storage areas comprise at least one buffer allocated only for its respective storage area.

The first processor reads the information from the third storage area and declares a successful cross compare if the information from the second processor is determined to be substantially identical to the information from the comparing processor. Likewise, the second processor reads the information from the fourth storage area and declares a successful cross compare if the information from the second processor is determined to be substantially identical to the information from the comparing processor.

Another illustrative, non-limiting formulation of the present invention is a method of performing a cross compare between memory locations of a multi-port memory written to simultaneously by plural processors, each port being provided with a buffer of a plurality of first layer buffers. In the first step of the method, each processor writes data to be cross compared to the buffer of the plurality of first layer buffers corresponding to the port of the respective processor. The data written to all of the first layer buffers is then transferred to a plurality of second layer buffers, each buffer of the plurality of second layer buffers providing a storage area for every buffer of the plurality of first layer buffers, and a buffer of the plurality of second layer buffers being provided for each of the plural processors.

Each processor then reads the information from a respective buffer of the plurality of second buffers, and compares the information read from its buffer of the plurality of second buffers, declaring a successful cross compare if information from another processor overlaps with information from the comparing processor in terms of storage areas being written to by the processors. The plurality of processors are synchronized prior to the transfer of data from the first layer of buffers to the second layer of buffers.

The second exemplary formulation may further describe determining whether there is additional information to be cross-compared, and if so, repeating the steps with the additional information, beginning at the step of each processor writing data to be cross compared.

Moreover, according to another, exemplary, non-limiting formulation of the present invention, a cross compare system for a multi-processor computer having at least a first, a second processor, and a third processor is provided. In this exemplary cross compare system, a first layer of buffers comprising a first storage area for storing information from the first processor, a second storage area for storing information from the second processor, and a third storage area for storing information from the third processor is provided. In addition, the cross compare system has a second layer of buffers comprising a fourth storage area, a fifth storage area, and a six storage area. Each storage area in the second layer of buffers stores the information from the first storage area, the information from the second storage area, and the information from the third storage area. The information from the first layers of buffers is automatically transferred to the second layer of buffer.

In this exemplary, non-limiting formulation of the present invention. Each of the first to sixth storage areas comprises at least one buffer allocated only for its storage area. In addition, in this exemplary cross compare system, the first, second, and third processors reads the information from the fourth, fifth, and sixth storage area, respectively, and compares information stored in its respective storage area to determine if the information of comparing processor is substantially identical to the information of the other two processors. When the information of the comparing processor matches the information of at least one of the other two processors, the cross compare system declares a successful cross-compare.

BRIEF DESCRIPTION OF THE DRAWINGS

The present invention will now be described in detail by describing illustrative, non-limiting embodiments thereof with reference to the accompanying drawings. In the drawings, the same reference characters denote analogous elements.

DETAILED DESCRIPTION OF THE EXEMPLARY, NON-LIMITING EMBODIMENTS

A cross compare is usually performed at the beginning and before the end of each application cycle, which is described in further detail herein below. During this activity, all the inputs and/or outputs are cross compared between the processors such as multiprocessor/central processor units (MPUs/CPUs), microprocessors, Run Time Vital Control Units and so on.

Figure 1:
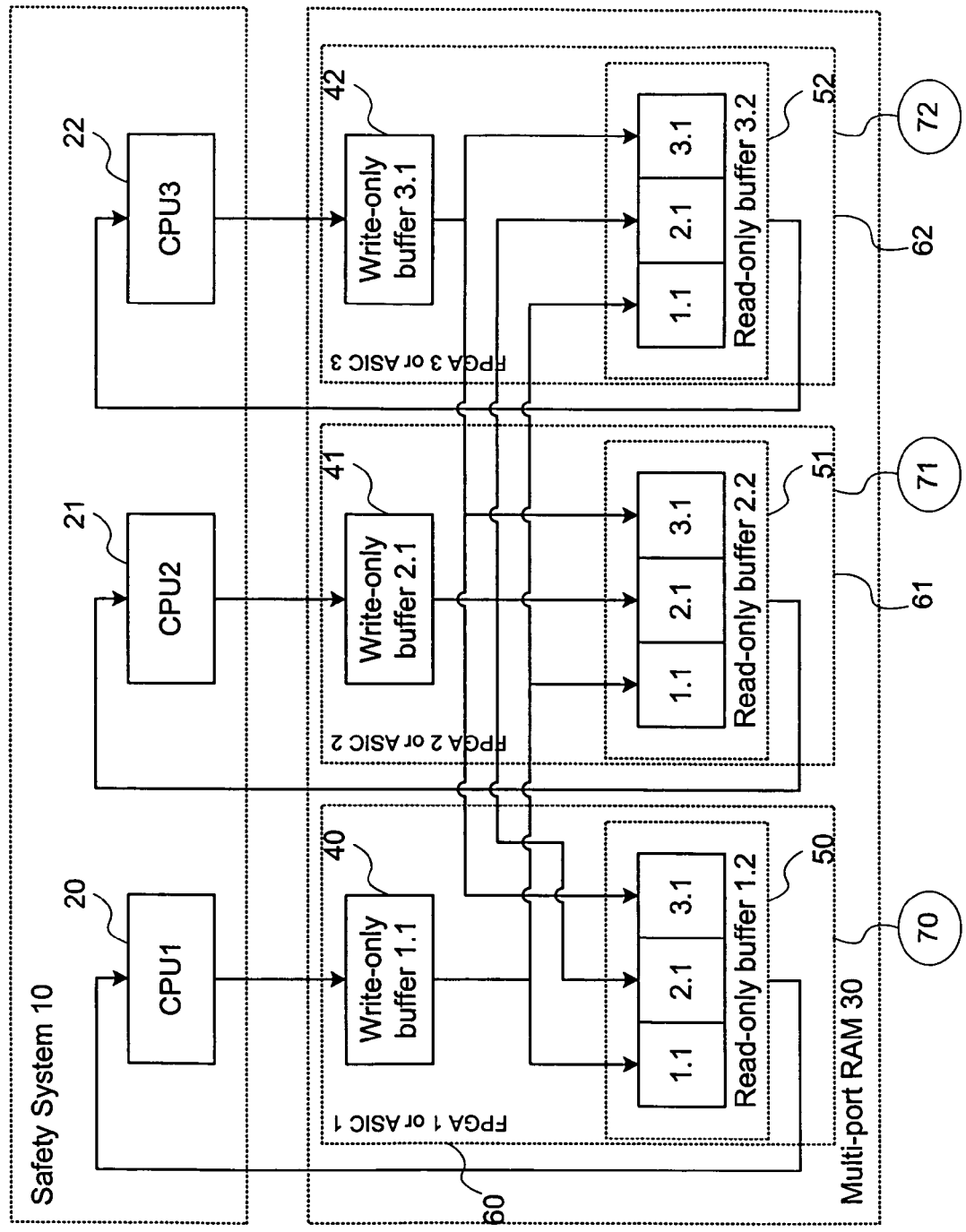
FIG. 1 illustrates an overview of the solution for a triplicated safety system in accordance with an illustrative, non-limiting embodiment of the present invention.

FIG. 1 illustrates a 2-out-of-3 configuration in accordance with the exemplary, non-limiting embodiment of the present invention. Referring to the system illustrated in FIG. 1, each CPU (20, 21, 22) of a safety system 10 represents either an exemplary CPU or an exemplary MPU or some other exemplary processor, depending upon the particular application. The terms CPU, MPU, and processor are used interchangeably herein. Performing the cross compare is just one of the functionalities of each processor.

Each CPU (20, 21, 22) uses its own bus to connect to a multi-port RAM (30). In the multi-port RAM 30, each CPU has its own memory space. Assigned to CPU1 (20) are write-only buffer 1.1 (40), and read-only buffer 1.2 (50); assigned to CPU2 (21) are write-only buffer 2.1 (41), and read-only buffer 2.2 (51); and assigned to CPU3 (22) are write-only buffer 3.1 (42), and read-only buffer 3.2 (52). Write-only and read-only are used herein with reference to the ability of the CPUs to access a buffer.

Tight controlled access is provided for each CPU to its own memory space. The read-only buffer for each CPU includes a register for each of the write-only buffers. In the present example, each read-only buffer (50, 51, 52) has three registers (1.1, 2.1, 3.1). Via internal logic (60, 61, 62), the data written by each CPU (20, 21, 22) gets copied from every write-only buffers (40, 41, 42) to a corresponding register of each read-only buffer (50, 51, 52) for each CPU. That is, two layers of buffers are provided. One layer is a write-only buffers (40, 41, 42) and the second layer is a read-only buffers (50, 51, 52). The data written into the write-only buffer 1.1 (40) by the CPU1 (20) is copied into registers 1.1 of the read-only buffers (50, 51, 52). Similarly, the data written into the write-only buffer 2.1 (41) by the CPU2 (21) and the data written into the write-only buffer 3.1 (42) by the CPU3 (22) are copied into registers 2.1 and 3.1, respectively, of the read-only buffers (50, 51, 52). In other words, in this illustrative, non-limiting embodiment, each processor (20, 21, 22) has one or more buffers from the first layer of buffers (40, 41, 42) and one or more buffers from the second layer of buffers (50, 51, 52).

Internal logic controlling the transfer of data process is implemented using FPGAs or ASIC (60, 61, 62). As illustrated in FIG. 1, for synchronization purposes, special logic in an FPGA or ASIC (60, 61, 62) can be implemented in order to make sure that while one CPUs (20, 21, 22) writes to its memory location, the others can only read "not ready" from their own location. FPGAs or ASICs perform required logic operations for the first and second layer buffers. Each processor (20, 21, 22) has its own individual FPGA or ASIC (60, 61, 62), respectively.

In addition, it is preferable to provide an individual power source (70, 71, 72) for each FPGA or ASIC (60, 61, 62). By having each processor (20, 21, 22) have its own individual FPGA or ASIC (60, 61, 62) powered by an individual power source (70, 71, 72) separation between processors (20, 21, 22) is ensured. For example, if one processor becomes faulty, it can simply be isolated and its data will be discarded, without impacting the other processors. That is, the processors that function normally disconnect themselves from the faulty processor in case of error detection in the cross-compare. One of ordinary skill in the art will know how to isolate a faulty processors and all various isolation techniques are within the scope of the invention.

Figure 2:
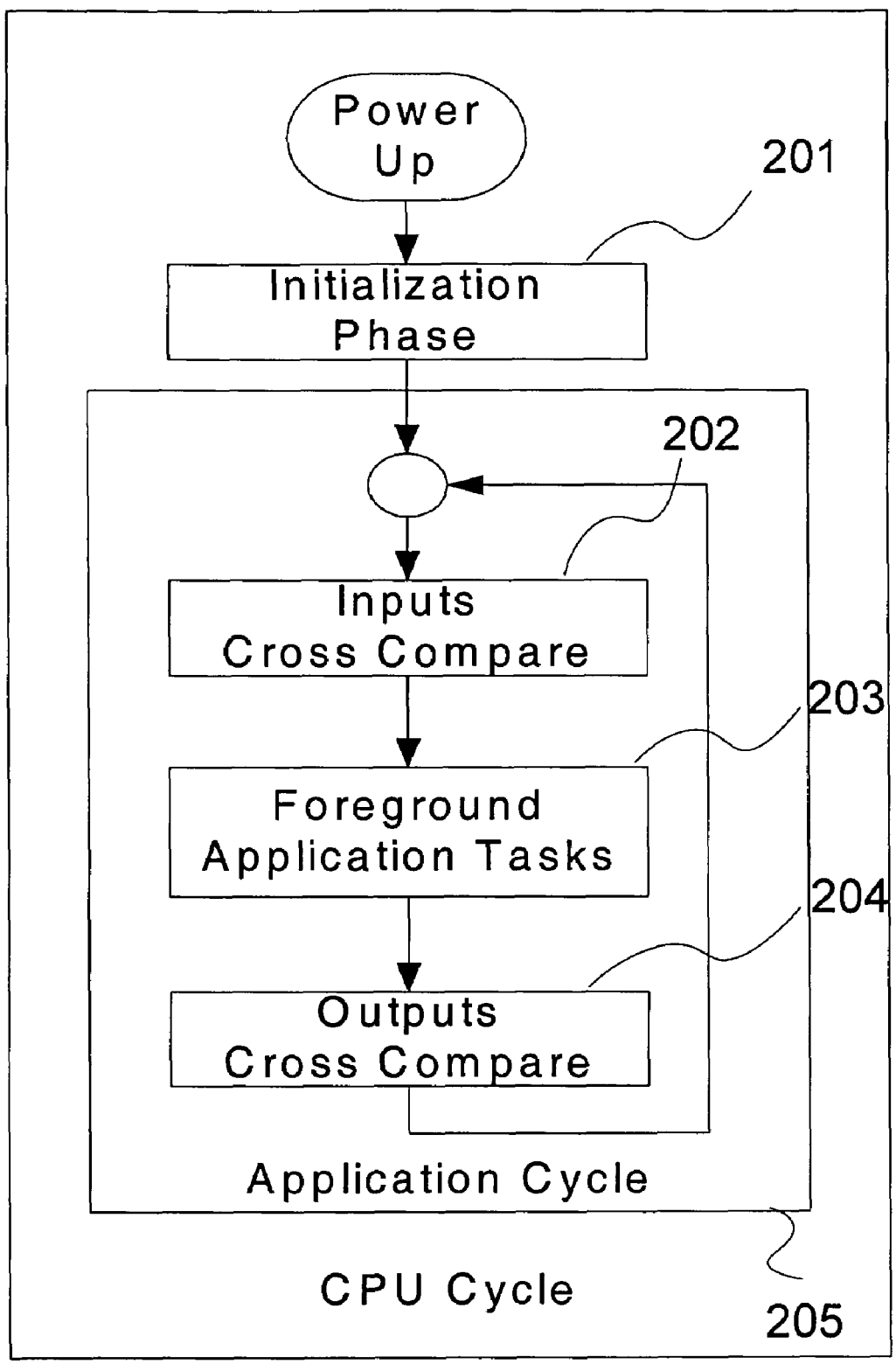
FIG. 2 illustrates the steps of a method performed in an application's cycle in accordance with illustrative, non-limiting embodiment of the present invention.
Figure 3:
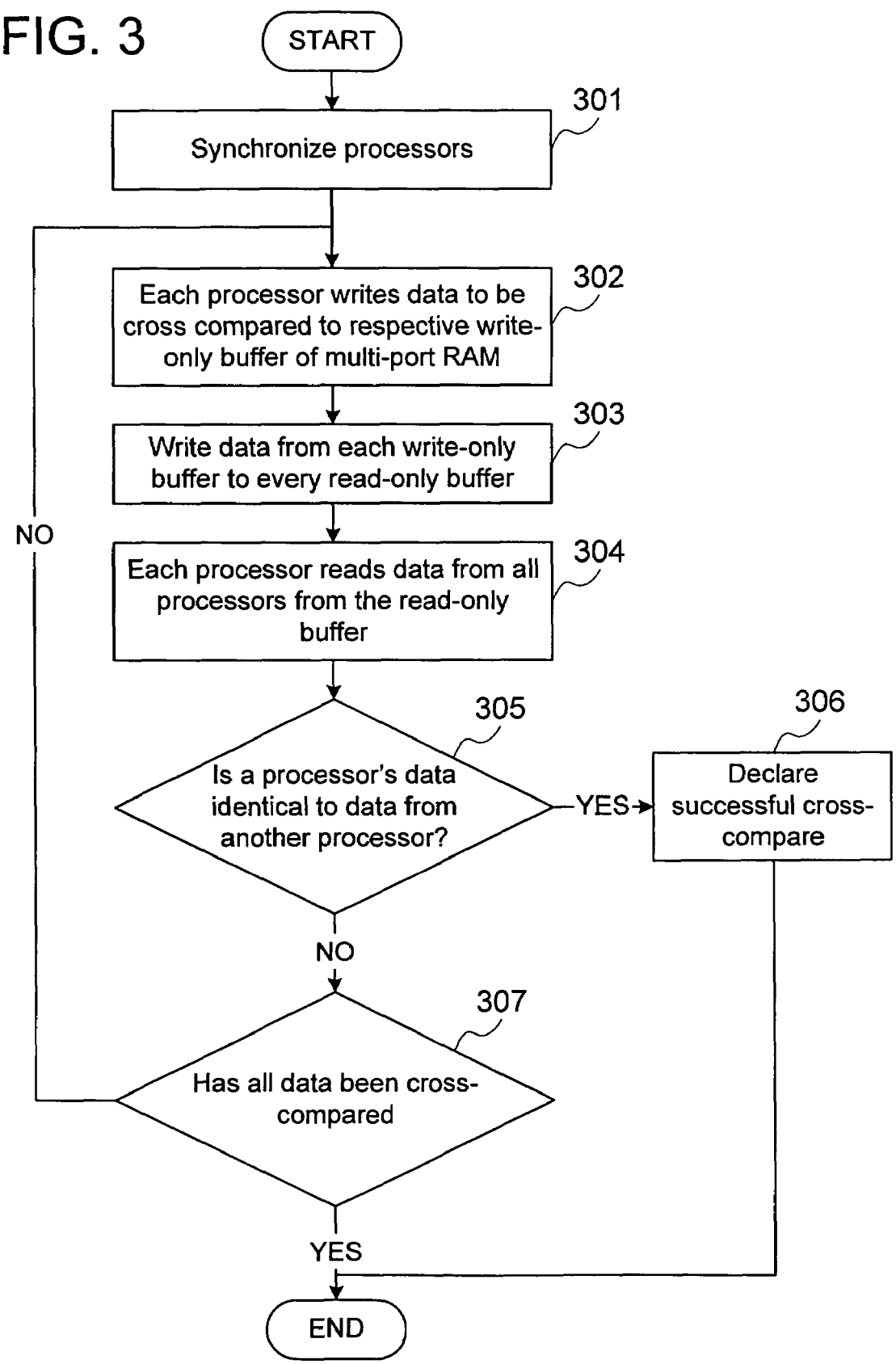
FIG. 3 illustrates steps of a method for performing a cross compare according to an illustrative, non-limiting embodiment of the present invention.

A cross compare for the system illustrated in FIG. 1 is performed by the steps illustrated in FIGS. 2 and 3. First, FIG. 2 shows the CPU cycle in accordance with this illustrative embodiment. In particular, the processors power up and then initialize (step 201) by any known conventional techniques. One of ordinary skill in the art would readily know a number of ways to power up and initialize a processor. After the processors are initialized, cross-compare of the inputs is implemented (step 202). The cross-compare of inputs (step 202) in accordance with the exemplary embodiment is described in further detail in FIG. 3. After the cross-compare of the inputs (step 202), a number of foreground application tasks are performed (step 203).

For example, each processor may be performing a variety of very complex computing operations. When the foreground application tasks are completed, the output, e.g., result of the computing operations, is also cross-compared (step 204). The cross-compare of the outputs in accordance with the exemplary embodiment is described in further detail in FIG. 3. After the outputs of the computing operations are cross-compared (step 204) by the processors, the application cycle (205) is completed, and a new cycle (205) can begin.

In this exemplary embodiment, each processor will inform itself of the completion of the cross-compare without any signaling to the other processors. After the successful cross-compare the input and/or outputs will be available for polling. Alternatively, the input and/or outputs can be provided by generating an interrupt. Polling, generation of the interrupt or some other solution is within the scope of the invention. The solution chosen will depend on the application and hardware being used.

Next, with reference to FIG. 3, a detailed description of the exemplary, non-limiting cross-compare of the inputs and/or outputs (203, 205) will be described. FIG. 3 shows the synchronization of the CPUs (step 301). Synchronization can be performed either by hardware and/or software, using any number of techniques. As an example of one of the many ways synchronization can be achieved, the three CPUs can poll a specific memory location, one for each CPU, where the other CPUs will update its cross compare readiness. Reading from the memory location clears the updated value in order to avoid stale information. Special logic in an FPGA or ASIC can be implemented in order to make sure that while one CPU writes to its memory location the others can only read "not ready" from their own location.

Synchronization may occur at a variety of places as long as the processors are synchronized before the transfer of data into the read-only layer of buffers (50, 51, 52). For example, the data may be written into the first layer of buffers, the write-only layer (40, 41, 42) asynchronously. The synchronization (301) would then take place before the transfer of data into the second layer of buffers (50, 51, 52). Moreover, in this exemplary embodiment, a special timeout is provided to prevent cycle overruns, which is considered a major failure of the processor. For example, if processor 20 was isolated because of some failure, processors 21 and 22 will proceed with cross-compare after a predetermined time period, the special timeout, even if successful synchronization with the processor 20 is not detected. Thereby, deadlocking the normally functioning processors 21 and 22 is prevented.

In the example illustrated in FIG. 3, the CPUs are synchronized before writing data into the first layer of buffer. In particular, once the CPUs are synchronized, each CPU writes the data to be cross compared to it respective write-only buffer (step 302). The data from each write-only buffer is then transferred into each read-only buffer (step 303) using logic implemented in the FPGA or ASIC (60, 61, 62).

Each CPU then reads the data for all three CPUs (20, 21, 22) from its respective read-only buffer (50, 51, 52) (step 304), and compares its data with the data from the other processors (step 305). A successful cross compare will be declared if at least 2-out-of-3 cross compared data in a read-only buffer are identical (step 306). For example, the processor 20 will compare data stored in register 1.1 with data in registers 2.1 and 3.1 located in the buffer 50. A successful cross-compare results when information from the register 1.1 of the buffer 50 overlaps with information from the registers 2.1 and/or 3.1 of the buffer 50.

A successful cross compare can be declared by any of the CPUs, each of which makes its own comparison of the data. If a CPU determines that there is identical data from two other CPUs, but its own data is not identical to data from any of the other CPUs, a successful cross compare is not declared by that CPU. In such a circumstance, however, the two CPUs that originated the identical data will each declare a successful cross compare (step 306) based upon their comparisons of the data from their own respective read-only buffers.

For a large amount of data to be cross-compared, i.e., exceeding the RAM capacity, after step 304, a determination can be made as to whether all of the data has been cross compared (step 307). If there is remaining data, the sequence returns to step 302, each processor writing the next data to be cross compared to the respective write-only buffer. Only when it is determined that all data was exchanged, will step 305 follows.

Step 307 can be omitted by implementing a sufficiently large RAM, since the need for step 307 depends on the size of data required to be cross compared. In order to have the best response time, a large cross compare area will ensure the cross compare process can be accomplished with one data packet.

Systems such as real time vital control units (RTVCUS) are an example of a system ideally suited for use with the above described cross compare solution. No new communication protocols are required, and the solution is limited only by memory access time.

The above description of illustrative, non-limiting embodiments has been given by way of an example. The above and other features of the invention including various novel method steps and various novel components have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof. It is further contemplated that numerous modifications may be made to the embodiments and implementations of the present invention without departing from the spirit and scope of the invention as defined in the following claims.

What is claimed is:

1. A cross compare system for a multi-processor computer having at least a first and a second processor, comprising:
   a multiport RAM comprising a first layer of buffers and a second layer of buffers, wherein both the first processor and the second processor are connected to the multiport RAM;
   the first layer of buffers comprising a first storage area of the multiport RAM for storing information from the first processor and a second storage area of the multiport RAM for storing information from the second processor;
   the second layer of buffers comprising a third storage area of the multiport RAM for storing the information from said first storage area and the information from said second storage area, and a fourth storage area of the multiport RAM for storing the information from said first storage area and the information from said second storage area, the information from said first storage area and said second storage area being automatically transferred to said third storage area and said fourth storage area;
   wherein each of said first, second, third, and fourth storage areas of the multiport RAM comprise a respective at least one buffer allocated only for its storage area, wherein simultaneous access to any one memory locations in the first, second, third and fourth storage areas is not possible;
   wherein said first processor reads the information from said third storage area and compares data stored in the third storage area from the first storage area with data stored in the third storage area from the second storage area to determine if the information stored in said third storage from the first storage area is substantially identical to the information stored in the third storage area from the second storage area; and
   wherein said second processor reads the information from said fourth storage area and compares data stored in the fourth storage area from the first storage area with data stored in the fourth storage area from the second storage area to determine if the information stored in said fourth storage area from the first storage area is substantially identical to the information stored in the fourth storage area from the second storage area.

2. The cross compare system for a multi-processor computer according to claim 1, wherein the first layer of buffers are write-only and wherein the second layer of buffers are read-only buffers.

3. The cross compare system for a multi-processor computer according to claim 2, wherein the first and the second processors write data into the first layer buffers asynchronously and wherein the data from the first layer buffer is transferred into the second layer buffers synchronously.

4. The cross compare system for a multi-processor computer according to claim 1, wherein when the data being compared in said first processor does not match, isolating said first processor, and wherein when the data being compared in said second processor does not match, isolating said second processor.

5. The cross compare system for a multi-processor computer according to claim 1, wherein a timeout is provided for reading data for the cross comparison from the second layer buffers by the first and the second processors.

6. The cross compare system for a multi-processor computer according to claim 1, wherein the first and second processors are synchronized before the cross-comparison, and wherein the synchronization is detected via polling of the second layer buffers by each of the first and second processors.

7. The cross compare system for a multi-processor computer according to claim 1, wherein each of the first and the second processors is one of a Central Processing Unit, a microprocessor, a Run Time Vital Control Unit, and a Multiprocessor Unit.

8. The cross compare system for a multi-processor computer according to claim 1, wherein the first and second layer buffers form a Multi-port Random Access Memory that is plugged into a backplane of the first and second processors connecting to a standard or a non-standard bus.

9. The cross compare system for a multi-processor computer according to claim 1, wherein FPGAs or ASICs perform required logic operations for the first and second layer buffers, and wherein for a storage area from the first and second layer buffers allocated to a particular processor from the first and second processors, an individual FPGA or ASIC is provided.

10. The cross compare system for a multi-processor computer according to claim 9, wherein for each of the FPGAs or ASICs an individual power source is provided.

11. The cross compare system for a multi-processor computer according to claim 1, wherein each of said third and fourth storage areas comprises a first register for the data from the first storage area and a second register for the data from the second storage area, and each of said first and second processors compares data from the first register with data from the second register, and wherein a successful cross-compare is declared when the data in the first register is identical to the data in the second register, where both the first and second registers are in a storage area allocated exclusively for a comparing processor.

12. The cross compare system for a multi-processor computer according to claim 11, wherein said data stored in the first and second registers are input to a computing operation or an output of the computing operation.

13. A method of performing a cross compare for a multi-processor computer having at least three processors, where each of said at least three processors uses a separate memory location within a multiport RAM and where each of said at least three processors is provided with an individual port and each of the individual ports is provided with a buffer of a plurality of first layer buffers within the multiport RAM, the method comprising ordered steps of:
  (a) each processor writing information to be cross compared to the buffer of said plurality of first layer buffers within the multiport RAM corresponding to the port of the respective processor;
  (b) transferring information written to all of said plurality of the first layer buffers to a plurality of second layer buffers within the multiport RAM, each buffer of the plurality of second layer buffers providing a storage area for every buffer of the first plurality of buffers, and a buffer of the plurality of second layer buffers being provided for each of the plurality of processors, wherein simultaneous access to a memory location in any one of the plurality of first layer buffers and the plurality of second layer buffers is not possible;
  (c) each processor reading the information from a respective buffer of the plurality of second layer buffers within the multiport RAM; and
  (d) each processor comparing the information read from its buffer of the plurality of second layer buffers within the multiport RAM, declaring a successful cross compare if information from another processor matches information from the comparing processor, wherein said at least three processors are synchronized before executing the transfer of information in the ordered step (b).

14. A method of performing a cross compare according to claim 13, further comprising an ordered step of:
  (e) determining whether there is additional information to be cross-compared, and if so, repeating the steps with the additional information, beginning at step (a).

15. A method of performing a cross compare according to claim 13, further comprising detecting successful synchronization by each of said plurality of processors via polling of its corresponding buffer from the plurality of the second buffers, and wherein when after a predetermined period of time, the successful synchronization between all of said plurality of processors is not detected by a processor from the plurality of processors, executing a timeout operation and performing the comparison of the information by the processor.

16. A method of performing a cross compare according to claim 13, wherein said synchronization is performed before the ordered step (a) so as to write the information to be cross compared to said plurality of first layer buffers simultaneously.

17. A method of performing a cross compare according to claim 13, wherein said synchronization is performed after the ordered step (a) so as to write the information to be cross compared to said plurality of first layer buffers asynchronously.

18. A method of performing a cross compare according to claim 13, wherein said synchronization of data and said cross-comparing is performed twice per each processor cycle, one at a beginning of the processor cycle for input data and the other at an end of the processor cycle for output data.

19. A method of performing a cross compare according to claim 18, wherein said comparison of the output data is performed after computational processing in each of the plurality of processors.

20. A method of performing a cross compare according to claim 19, wherein said transfer of data in the ordered steps (a) and (b) and said computational processing is performed by a plurality of FPGAs or ASICs, and wherein at least one FPGA or ASIC is provided for each of the at least three processors.

21. A method of performing a cross compare according to claim 13, wherein each one of the second layer buffers comprises at least one separate register for each processor from said at least three processors.

22. A cross compare system for a multi-processor computer having at least a first, a second processor, and a third processor, comprising:
  a multiport RAM comprising a first layer of buffers and a second layer of buffers, wherein each of the first processor, the second processor and the third processor are connected to the multiport RAM;
  the first layer of buffers comprising a first storage area for storing information from the first processor, a second storage area for storing information from the second processor, and a third storage area for storing information from the third processor;
  the second layer of buffers comprising a fourth storage area, a fifth storage area, and a sixth storage area, each storing the information from said first storage area, the information from said second storage area, and the information from said third storage area, the information from said first layer of buffers is automatically transferred to said second layer of buffers;
  wherein each of said first to sixth storage areas of the multiport RAM comprises at least one buffer allocated only for its storage area, wherein simultaneous access to any one memory location in the first, second, third, fourth, fifth and sixth storage areas is not possible;
  wherein said first, second, and third processor reads the information from said fourth, fifth, and sixth storage area, respectively, and compares the information stored in its respective storage area to determine if the information of a comparing processor is substantially identical to the information of the other two processors;
  and wherein a successful cross-compare is declared when the information of the comparing processor matches the information of at least one of the other two processors.

23. The cross compare system for a multi-processor computer according to claim 22, wherein the first layer of buffers are write-only and wherein the second layer of buffers are read-only buffers.

24. The cross compare system for a multi-processor computer according to claim 23, wherein the first, second, and third processors write data into the first layer buffers asynchronously and wherein the data from the first layer buffer is transferred into the second layer buffers synchronously.

25. The cross compare system for a multi-processor computer according to claim 22, wherein when the information from the comparing processor does not match the information of the two other processors, the successful cross-compare cannot be declared and the comparing processor is isolated.

26. The cross compare system for a multi-processor computer according to claim 25, wherein a timeout is provided for reading data for the cross comparison from the second layer buffers by the first, second, and third processors.

27. The cross compare system for a multi-processor computer according to claim 22, wherein the first, second, and third processors are synchronized before the cross-comparison, and wherein the synchronization is detected via polling of the second layer buffers by each of the first, second, and third processors.

28. The cross compare system for a multi-processor computer according to claim 22, wherein each of the first, second, and third processors is one of a Central Processing Unit, a microprocessor, a Run Time Vital Control Unit, and a Multiprocessor Unit.

29. The cross compare system for a multi-processor computer according to claim 22, wherein the first and second layer buffers form a Multi-port Random Access Memory that is plugged into a backplane of the first, second, and third processors connecting to a standard or a non-standard bus.

30. The cross compare system for a multi-processor computer according to claim 22, wherein FPGAs or ASICs perform required logic operations for the first and second layer buffers, and wherein for a storage area from the first and second layer buffers allocated to a particular processor from the first, second, and third processors, an individual FPGA or ASIC is provided.

31. The cross compare system for a multi-processor computer according to claim 30, wherein for each of the FPGAs or ASICs an individual power source is provided.

32. The cross compare system for a multi-processor computer according to claim 22, wherein each storage area, namely said fourth, fifth, and six storage areas, of the second layer of buffers comprises a register, namely a first, a second, and a third register, for each processor, namely the first, second, and the third processors, wherein the first processor compares the information stored in the first register of the fourth storage area with the information stored in the second register and with the information stored in the third register of the fourth storage area, wherein the second processor compares the information stored in the second register of the fifth storage area with the information stored in the first register and with the information stored in the third register, of the fifth storage area, and wherein the third processor compares the information stored in the third register of the sixth storage area with the information stored in the first register and with the information stored in the second register, of the sixth storage area.

33. The cross compare system for a multi-processor computer according to claim 32, wherein for each of said first, second, and third processors, an individual port is provided for transferring information from its respective storage area of the second layer of buffers to a respective processor for performing said comparison.

34. The cross compare system for a multi-processor computer according to claim 32, wherein said data stored in the first, second, and third registers are inputs for executing at least one computing operation or outputs of the at least one computing operation.

* * * * *